US009562530B2

(12) United States Patent
Sun

(10) Patent No.: US 9,562,530 B2
(45) Date of Patent: Feb. 7, 2017

(54) ROTOR PUMP AND ROTARY MACHINERY COMPRISING THE SAME, THE ROTOR PUMP INCLUDING A PUMP BODY FORMING AN ACCOMMODATION CAVITY, A PUMP WHEEL ROTATING IN THE ACCOMMODATION CAVITY AND A SEALING PLATE HAVING AN ECCENTRIC HOLE THAT IS ECCENTRIC RELATIVE TO A ROTATION AXIS OF THE PUMP WHEEL, WHERE A SHAFT PORTION OF THE PUMP WHEEL IS ROTATABLY FITTED IN THE ECCENTRIC HOLE

(71) Applicant: EMERSON CLIMATE TECHNOLOGIES (SUZHOU) CO., LTD., Jiangsu (CN)

(72) Inventor: Qingfeng Sun, Jiangsu (CN)

(73) Assignee: Emerson Climate Technologies (Suzhou) Co., Ltd., Jiangsu (CN)

( * ) Notice: Subject to any disclaimer, the term of this patent is extended or adjusted under 35 U.S.C. 154(b) by 167 days.

(21) Appl. No.: 14/394,028

(22) PCT Filed: Apr. 9, 2013

(86) PCT No.: PCT/CN2013/073918
§ 371 (c)(1),
(2) Date: Oct. 13, 2014

(87) PCT Pub. No.: WO2013/152706
PCT Pub. Date: Oct. 17, 2013

(65) Prior Publication Data
US 2015/0071805 A1 Mar. 12, 2015

(30) Foreign Application Priority Data

Apr. 12, 2012 (CN) .......................... 2012 1 0106598
Apr. 12, 2012 (CN) ..................... 2012 2 0152890 U

(51) Int. Cl.
F03C 4/00 (2006.01)
F04C 2/00 (2006.01)
(Continued)

(52) U.S. Cl.
CPC ................. *F04C 2/025* (2013.01); *F04C 2/32* (2013.01); *F04C 27/007* (2013.01);
(Continued)

(58) Field of Classification Search
CPC ........... F04C 2/025; F04C 2/32; F04C 23/008; F04C 29/02; F04C 29/023; F04C 29/025; F04C 27/005; F04C 27/007; F04C 18/0215; F01C 1/0215; F16N 7/366; F16N 13/00
(Continued)

(56) References Cited

U.S. PATENT DOCUMENTS 4,898,521 A * 2/1990 Sakurai ................. F04C 29/023
418/55.6
5,386,163 A 1/1995 Heilman
(Continued)

FOREIGN PATENT DOCUMENTS

CN 201391447 Y 1/2010
CN 201679717 U 12/2010
(Continued)

OTHER PUBLICATIONS

International Search Report for PCT/CN2013/073918 (in English and Chinese), mailed Jul. 18, 2013; ISA/CN.
(Continued)

*Primary Examiner* — Theresa Trieu
(74) *Attorney, Agent, or Firm* — Harness, Dickey & Pierce, P.L.C.

(57) ABSTRACT

The present invention relates to a rotor pump (10), comprising: a pump body (50A) capable of being rotatably
(Continued)

driven and forming an accommodation cavity (52) therein; a pump wheel (20, 20A) having a main body part (22) capable of rotating in the accommodation cavity and a first shaft part (24) axially extending from the main body part; and a sealing plate (30) comprising an eccentric hole (32) being eccentric relative to the rotation axis of the pump body; the first shaft part is rotatably fitted in the eccentric hole; a suction channel (25) is formed on one side of the pump wheel, and a discharge channel is formed on the other side of the pump wheel; the suction channel and the discharge channel are respectively in fluid communication with a compression cavity formed between the outer circumference of the pump wheel and the inner circumference of the accommodation cavity. The present invention also relates to a rotary machinery comprising the rotor pump. The rotor pump of the present invention has a simple structure, fewer components and low cost.

28 Claims, 14 Drawing Sheets

(51) Int. Cl.

| | | |
|---|---|---|
| F04C 15/00 | (2006.01) | |
| F04C 2/02 | (2006.01) | |
| F04C 29/02 | (2006.01) | |
| F16N 7/36 | (2006.01) | |
| F04C 27/00 | (2006.01) | |
| F04C 2/32 | (2006.01) | |
| F01C 1/02 | (2006.01) | |
| F04C 23/00 | (2006.01) | |
| F04C 18/02 | (2006.01) | |

(52) U.S. Cl.
CPC .......... *F04C 29/023* (2013.01); *F04C 29/025* (2013.01); *F16N 7/366* (2013.01); *F01C 1/0215* (2013.01); *F04C 18/0215* (2013.01); *F04C 23/008* (2013.01)

(58) Field of Classification Search
USPC ............... 418/15, 55.1–55.6, 57, 88, 94, 97, 98,418/100; 184/6.16–6.18, 26, 31
See application file for complete search history.

(56) References Cited

U.S. PATENT DOCUMENTS

| | | | |
|---|---|---|---|
| 5,810,573 A * | 9/1998 | Mitsunaga | F04C 29/023 418/55.6 |
| 7,832,997 B2 | 11/2010 | Williamson et al. | |
| 8,905,737 B2 | 12/2014 | Ooi et al. | |
| 2007/0071627 A1* | 3/2007 | Lee | F04C 29/023 418/55.6 |
| 2007/0134118 A1* | 6/2007 | Yoo | F04C 29/023 418/55.6 |
| 2007/0183916 A1* | 8/2007 | Kim | F04C 29/023 418/55.6 |
| 2008/0069714 A1 | 3/2008 | Bonifas | |
| 2008/0166251 A1 | 7/2008 | Williamson et al. | |
| 2009/0068044 A1* | 3/2009 | Guo | F04C 18/0215 418/55.1 |
| 2009/0068045 A1* | 3/2009 | Su | F04C 18/0215 418/55.1 |
| 2009/0068048 A1* | 3/2009 | Stover | F04C 27/005 418/55.4 |
| 2010/0310401 A1 | 12/2010 | Ooi et al. | |

FOREIGN PATENT DOCUMENTS

| | | | |
|---|---|---|---|
| CN | 102135095 A | 7/2011 | |
| CN | 202597099 U | 12/2012 | |
| EP | 0592119 A1 | 4/1994 | |
| JP | H-05133358 A | 5/1993 | |
| JP | 09151884 A * | 6/1997 | ............ F04C 29/023 |
| JP | 09170579 A * | 6/1997 | ............ F04C 29/023 |
| JP | 4130470 B1 | 8/2008 | |
| KR | 1020070091150 | 9/2007 | |
| WO | WO-2004046554 A1 | 6/2004 | |
| WO | WO-2009105031 A1 | 8/2009 | |

OTHER PUBLICATIONS

First Chinese Office Action regarding Application No. 201210106598.3 dated Mar. 23, 2015. English translation provided by Unitalen Attorneys at Law.
First Korean Office Action regarding Application No. 10-2014-7031381 dated Apr. 6, 2016. English translation provided by Korean Intellectual Property Office.
European Search Report regarding 13776147.4-1608/2871364 PCT/CN2013/073918 dated Dec. 23, 2015.

* cited by examiner

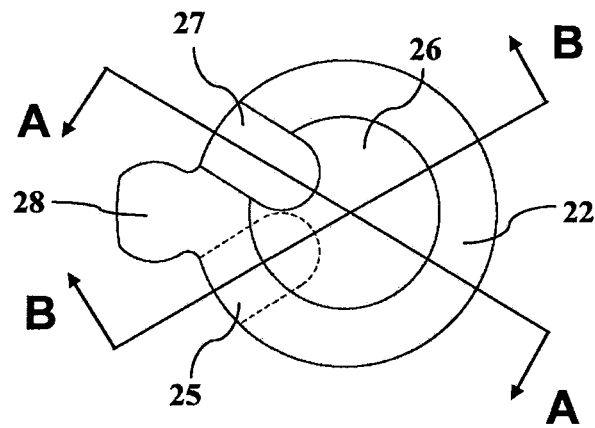
Fig. 8A
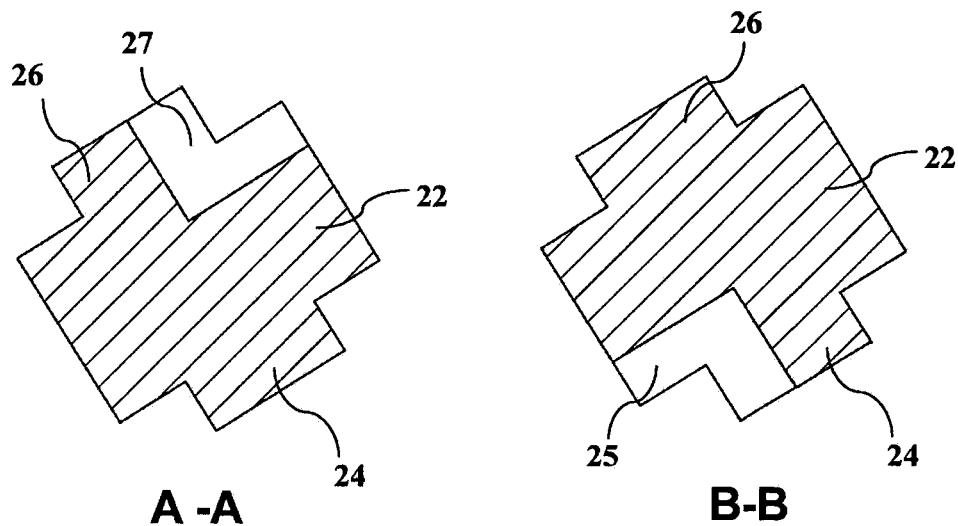
A-A
Fig. 8B
B-B
Fig. 8C

C-C

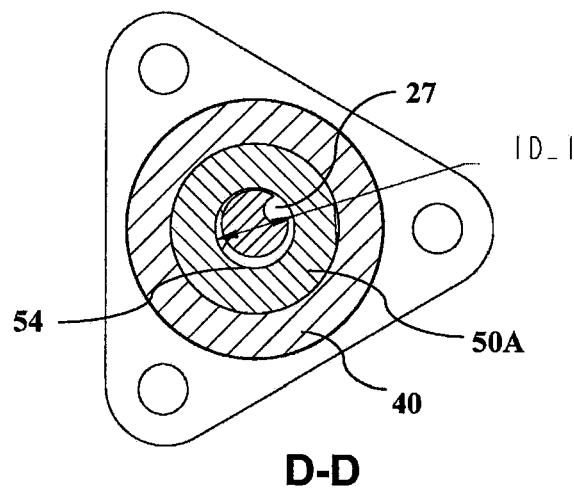
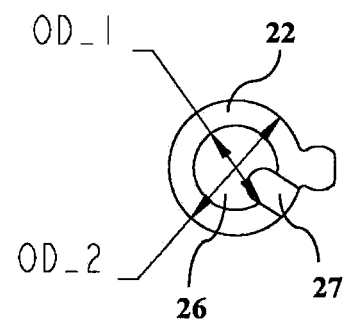
Fig. 12          Fig. 13
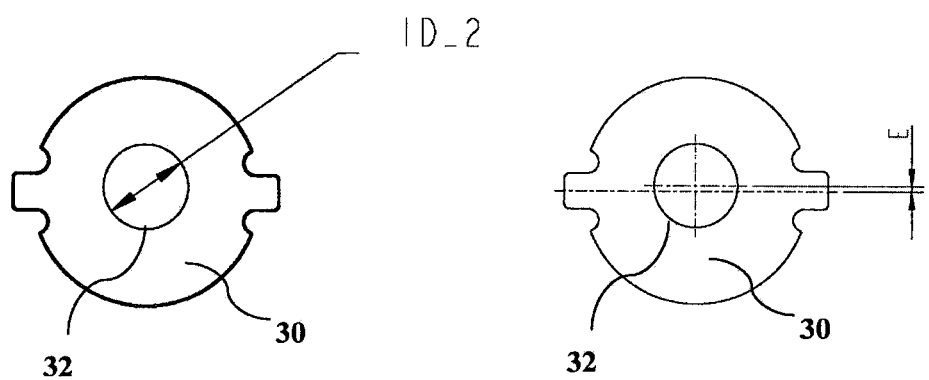
Fig. 14

ROTOR PUMP AND ROTARY MACHINERY COMPRISING THE SAME, THE ROTOR PUMP INCLUDING A PUMP BODY FORMING AN ACCOMMODATION CAVITY, A PUMP WHEEL ROTATING IN THE ACCOMMODATION CAVITY AND A SEALING PLATE HAVING AN ECCENTRIC HOLE THAT IS ECCENTRIC RELATIVE TO A ROTATION AXIS OF THE PUMP WHEEL, WHERE A SHAFT PORTION OF THE PUMP WHEEL IS ROTATABLY FITTED IN THE ECCENTRIC HOLE

CROSS REFERENCE OF RELEVANT APPLICATION

This application is the national phase of International Application No. PCT/CN2013/073918, titled "ROTOR PUMP AND ROTARY MACHINERY COMPRISING SAME", filed on Apr. 9, 2013, which claims priorities to the Chinese patent application No. 201210106598.3 titled "ROTOR PUMP AND ROTARY MACHINERY COMPRISING SAME" and filed with the State Intellectual Property Office on Apr. 12, 2012 and the Chinese patent application No. 201220152890.4 titled "ROTOR PUMP AND ROTARY MACHINERY COMPRISING SAME" and filed with the State Intellectual Property Office on Apr. 12, 2012, which are incorporated herein by reference in their entirety

TECHNICAL FIELD

The present application relates to a rotor pump and a rotary machinery including the rotor pump.

BACKGROUND

A compressor, such as a scroll compressor, generally includes a pumping device for pumping lubricating oil to lubricate and cool various components.

FIG. 1 shows a longitudinal sectional view of a conventional scroll compressor. The scroll compressor 100 generally includes a housing 110, a top cover 112 provided at one end of the housing 110, a bottom cover 114 provided at the other end of the housing 110, and a partition plate 116 which is provided between the top cover 112 and the housing 110 to divide an inner space of the compressor into a high pressure side and a low pressure side. The high pressure side is formed between the partition plate 116 and the top cover 112, and the low pressure side is formed among the partition plate 116, the housing 110 and the bottom cover 114. An inlet 118 for inflowing fluid is provided at the low pressure side, and an outlet 119 for discharging compressed fluid is provided at the high pressure side. In the housing 110, a motor 120 including a stator 122 and a rotor 124 is provided. A driving shaft 130 is provided in the rotor 124 to drive a compression mechanism including a fixed scroll 150 and a movable scroll 160. The driving shaft 130 has an upper end supported by a main bearing housing 140 and a lower end supported by a lower bearing 142. The upper end of the driving shaft 130 is provided with an eccentric crank pin 132. The eccentric crank pin 132 is fitted into a hub 162 of the movable scroll 160. When the motor 120 is driven, the eccentric crank pin 132 drives the movable scroll 160 to orbit relative to the fixed scroll 150 (that is, a central axis of the movable scroll 160 rotates about a central axis of the fixed scroll 150, but the movable scroll 160 itself will not rotate about the central axis thereof), thus compressing fluid between the fixed scroll 150 and the movable scroll 160.

In the driving shaft 130, provided are a central hole 134 extending upwards along a longitudinal direction from the lower end of the driving shaft 130, and an eccentric hole 136 which is offset relative to the central hole 134 and extends to an end of the eccentric crank pin 132. In the lower end of the driving shaft 130, a rotor pump 170 is provided as an oil pumping device. When the scroll compressor 170 operates, the rotor pump 170 sucks lubricating oil from an oil sump at the bottom of the housing 110 and pumps it into the central hole 134 of the driving shaft 130. Then, the lubricating oil enters into the eccentric hole 136 in communication with the central hole 134, and further moves upwards under the centrifugal force of the driving shaft 130 to reach the end of the eccentric crank pin 132. The lubricating oil discharged from the eccentric crank pin 132 flows downwards under the gravity and splashes under the action of moving components so as to lubricate and cool the components in the compressor.

Constructions and operation principles of other components of the compressor 100 can refer to, for example, the patent applications US2009/0068044A1, US2009/0068048A1, US2009/0068045A and the like, which are incorporated herein by reference in their entirety.

Construction and operation principle of the rotor pump 170 is described with reference to FIGS. 2 to 4C. However, it is noted that, the rotor pump 170 shown in FIGS. 2 to 4C and described below does not necessarily constitute the prior art with respect to the present application.

FIG. 2 shows an exploded perspective view of the rotor pump 170; FIG. 3 shows a longitudinal sectional view of the rotor pump 170 after being assembled; and FIGS. 4A, 4B and 4C show an operation process of the rotor pump.

The rotor pump 170 mainly includes a housing 172, a pump body 174, a pump wheel 176, a sealing plate 178, a covering plate 180 and a thrust sheet 182. The pump body 174 is provided inside the housing 172 and has a substantially cylindrical inner circumference. The pump wheel 176 is provided inside the pump body 174 and has a substantially cylindrical outer circumference. A recess 1741 is provided in the inner circumference of the pump body 174, and a protrusion 1761 is provided on the outer circumference of the pump wheel 176. In the central portion of the pump wheel 176, a driving hole 1762 driven by an eccentric pin 138 (see FIG. 1) on the lower end of the driving shaft 130 is provided. The protrusion 1761 of the pump wheel 176 is fitted in the recess 1741 of the pump body 174. Thus, when the eccentric pin 138 of the driving shaft 130 is inserted into the driving hole 1762 of the pump wheel 176 to drive the pump wheel 176, the protrusion 1761 of the pump wheel 176 can slide in the recess 1741 of the pump body 174 and pivots about a connect point between the protrusion 1761 and the recess 1741. During rotation of the pump wheel 176, a contact point between the outer circumference of the pump wheel 176 and the inner circumference of the pump body 174 moves along a direction in which the pump wheel 176 is driven, so that the volume of an operating cavity formed between the pump wheel 176 and the pump body 174 is gradually changed, thereby pumping fluid, which will be described below with reference to FIGS. 4A to 4C.

A sealing plate 178 is provided at one side of the pump wheel 176. Also, referring to FIG. 4A, an inlet 1781 for inflowing fluid and an outlet 1782 for discharging fluid are provided at positions on the sealing plate 178 that substantially correspond to the inner circumference of the pump body 174. The inlet 1781 and the outlet 1782 are provided on the two opposite sides of the recess 1741 and near the recess 1741. The sealing plate 178 is further provided with a central through hole 1783 at a central portion thereof. A covering plate 180 is provided on one side of the sealing plate 178 and is assembled with the housing 172. The covering plate 180 is provided therein with a through hole 1801 in communication with the inlet 1781 of the sealing plate 178 for introducing external fluid and a guiding groove 1802 which communicates the outlet 1782 with the central through hole 1783 of the sealing plate 178. The thrust sheet 182 is provided on the other side of the pump wheel 176 for preventing the pump wheel 176 from displacing axially.

The operation principle of the rotor pump 170 shown in FIGS. 2 to 3 is described with reference to FIGS. 4A to 4C. It is assumed that the pump wheel 176 is driven along a direction indicated by arrows in the figures. An operation cavity of the rotor pump is defined between the inner circumference of the pump body 174 and the outer circumference of the pump wheel 176. Specifically, the operation cavity in communication with the inlet 1781 of the sealing plate 178 is referred to as a suction cavity 192, and the operation cavity in communication with the outlet 1782 of the sealing plate 178 is referred to as a discharge cavity 194. The suction cavity 192 and the discharge cavity 194 are separated from each other by a contact point CP between the pump body 174 and the pump wheel 176.

During normal operation, the external fluid flows in the suction cavity 192 through the through hole 1801 in the covering plate 180 and the inlet 1781 of the sealing plate 178, and the compressed fluid flows through the outlet 1782 in the sealing plate 178 and the guiding groove 1802 in the covering plate 180 and finally is discharged through the central through hole 1783 in the sealing plate 178, for example, into a through hole provided in the driving shaft 130.

In the state shown in FIG. 4A, the suction cavity 192 is small, and the discharge cavity 194 is big. As shown in FIGS. 4B and 4C, as the pump wheel rotates along the direction indicated by the arrow, the suction cavity 192 gradually increases to suck fluid; and the discharge cavity 194 gradually decreases so as to urge the fluid to be discharged through the outlet 1782.

However, the above rotor pump has a complex structure and has a number of components. Thus, it is still possible to improve the rotor pump to further simplify the structure of the rotor pump, reduce the number and the volume of the components thereof, and reduce the cost thereof.

SUMMARY

An object of one or more embodiments according to the present application is to provide a rotor pump having a simpler structure.

Another object of one or more embodiments according to the present application is to provide a rotor pump having less components and a smaller volume.

A yet another object of one or more embodiments according to the present application is to provide a rotor pump having a lower cost.

A further object of one or more embodiments according to the present application is to provide a rotary machinery including a rotor pump.

In an aspect of the specification, there is provided a rotor pump including a pump body, a pump wheel and a sealing plate. The pump body is capable of being rotatably driven, and is formed therein with a substantially cylindrical accommodation cavity. The accommodation cavity has a bottom wall, and a recess is provided on an inner circumference of the accommodation cavity. The pump wheel includes a substantially cylindrical main body portion which is capable of swinging in the accommodation cavity, a protrusion which radially extends from the main body portion and is capable of being fitted in the recess, and a substantially cylindrical first shaft portion which axially extends from the main body portion. The sealing plate is positioned relative to the pump body and includes an eccentric hole which is eccentric relative to a rotation axis of the pump body. The first shaft portion of the pump wheel is rotatably fitted in the eccentric hole. A suction channel is formed on one side of the pump wheel, and a discharge channel is formed on the other side of the pump wheel. The suction channel and the discharge channel are each in fluid communication with a compression cavity formed between an outer circumference of the pump wheel and the inner circumference of the accommodation cavity.

Preferably, the suction channel extends to an end face of the first shaft portion.

Preferably, the diameter $OD\_1$ of the first shaft portion is substantially equal to the diameter $ID\_2$ of the eccentric hole.

Preferably, one end face of the main body portion of the pump wheel abuts against the bottom wall of the accommodation cavity of the pump body, and the other end face of the main body portion of the pump wheel abuts against the sealing plate.

Preferably, the sealing plate abuts against an end face of the pump body.

Preferably, the axial height of the main body portion of the pump wheel is substantially equal to the axial height of the accommodation cavity of the pump body.

Preferably, the diameter $ID\_3$ of the accommodation cavity of the pump body is greater than the diameter $OD\_2$ of the main body portion of the pump wheel.

Preferably, the diameter $ID\_3$ of the accommodation cavity of the pump body, the diameter $OD\_2$ of the main body portion of the pump wheel and the eccentric distance $E$ of the eccentric hole satisfy the following equation:

$$ID\_3 = OD\_2 + 2*E.$$

Preferably, the rotor pump further includes a bearing housing for supporting the pump body, wherein the sealing plate is fixed in the bearing housing.

Preferably, at least one protrusion is formed on one of the bearing housing and the sealing plate, and at least one groove corresponding to the protrusion is formed on the other one of the bearing housing and the sealing plate.

Preferably, the sealing plate is fixed in the bearing housing by a retainer ring.

Preferably, a biasing spring is arranged between the sealing plate and the retainer ring.

Preferably, the diameter $OD\_2$ of the main body portion is greater than the diameter $OD\_1$ of the first shaft portion.

Preferably, a discharge hole is formed in the bottom wall of the accommodation cavity.

Preferably, the discharge hole is of a substantially cylindrical shape. The diameter $OD\_2$ of the main body portion of the pump wheel, the diameter $ID\_1$ of the discharge hole of the pump body and the eccentric distance $E$ of the eccentric hole satisfy the following equation:

$$OD\_2 \geq ID\_1 + 2*E.$$

Preferably, the pump wheel further includes a substantially cylindrical second shaft portion which axially extends from the main body portion in a direction opposite to the first shaft portion.

Preferably, the discharge channel extends to an end face of the second shaft portion.

Preferably, the diameter of the second shaft portion is substantially equal to the diameter of the first shaft portion.

Preferably, the axial height of the second shaft portion is substantially equal to the axial height of the first shaft portion.

Preferably, the second shaft portion is fitted into the discharged hole, and the diameter OD_1 of the second shaft portion is smaller than the diameter ID_1 of the discharge hole of the pump body.

Preferably, the suction channel and the discharge channel are arranged on two opposite sides of the protrusion and close to the protrusion.

Preferably, the suction channel axially extends from the end face of the first shaft portion into the main body portion and has an opening on a circumferential surface of the main body portion, and the discharge channel axially extends from the end face of the second shaft portion into the main body portion and has an opening on the circumferential surface of the main body portion.

Preferably, the suction channel is provided on an upstream side of the protrusion in a direction in which the pump wheel is driven, and the discharge channel is provided on a downstream side of the protrusion in a direction in which the pump wheel is driven.

In another aspect of the present specification, there is provided a rotary machinery including the above rotor pump.

Preferably, the rotary machinery further includes a driving shaft, wherein the pump body is integrally formed with the driving shaft.

Preferably, the rotary machinery further includes a driving shaft, wherein the pump body is formed by a part of the driving shaft.

Preferably, the rotary machinery further includes a driving shaft, wherein the pump body is rotationally driven by the driving shaft.

Preferably, the pump body is rotationally driven by the driving shaft via one of a belt, a chain and a gear.

Preferably, the rotary machinery is a compressor.

Preferably, the compressor is a scroll compressor.

The rotor pump and the rotary machinery of one or several embodiments according to the present application have the following advantages:

In the rotor pump of the embodiment according to the present application, the pump body can be rotationally driven; the suction channel and the discharge channel are formed on the pump wheel; and the pump wheel swings in the accommodation cavity of the pump body. Furthermore, the bottom surface of the accommodation cavity of the pump body, the sealing plate, the pump wheel and the inner circumference of the accommodation cavity form the compression cavity. By fitting the first shaft portion of the pump wheel in the eccentric hole of the sealing plate, the pump wheel can eccentrically swing in the accommodation cavity so as to change the volume of the compression cavity to achieve suction and pumping of the fluid. The rotor pump of the embodiment according to the present application only includes three components, which are the pump body, the pump wheel and the sealing plate. Thus, the structure is relatively simple. Additionally, compared with a conventional rotor pump, the thrust sheet and the covering plate can be omitted, reducing the number of the components and the cost. Since the eccentric characteristic is designed on the sealing plate instead of on the driving shaft, the manufacturing process is simplified. Moreover, since the dimension and the volume of the pump body are substantially not limited by the driving shaft, the rotor pump can have a very small overall volume. After test by the inventor in practice, pumping of the fluid can be reliably and stably achieved by the rotor pump of the embodiment according to the present application.

In the rotor pump of the embodiment according to the present application, if specific dimension relationship of various components of the rotor pump is met as defined, the rotor pump can operate at a higher efficiency.

In the rotor pump of the embodiment according to the present application, the pump wheel is further provided with a second shaft portion which can has the same dimension with the first shaft portion. In this case, the pump wheel is in a substantially symmetric state as a whole and thus may be manufactured easily. And, during assembling, it is not necessary to identify the first shaft portion and the second shaft portion, which further simplifies the process of assembling.

In the rotor pump of the embodiment according to the present application, a biasing spring is provided between the sealing plate and the retainer ring for fixing the sealing plate. Hence, even if the driving shaft is displaced axially, it can be ensured that the sealing plate can always abut against the end face of the driving shaft, improving the stability of the rotor pump.

In the rotary machinery of the embodiment according to the present application, since it uses the above rotor pump, in addition to the above advantages, the following advantages can be achieved. The pump body of the rotor pump can be integrally formed with the driving shaft of the rotary machinery, or the pump body can be formed by a part of the driving shaft. With such construction, the construction of the rotary machinery is further simplified and the number of the components of the rotary machinery is further reduced. Furthermore, the pump body and the driving shaft can be separately provided, and the pump body can be driven by means of, for example, belt, chain or gear. With such construction, individual components can be more flexibly arranged.

BRIEF DESCRIPTION OF THE DRAWINGS

Features and advantages of one or more embodiments of the present application will become apparent from the following description made with reference to the accompanying drawings, in which:

FIG. 8A is a top view of the pump wheel shown in FIG. 5; FIG. 8B is a sectional view taken along a section line A-A in FIG. 8A; and FIG. 8C is a sectional view taken along a section line B-B in FIG. 8A;

FIG. 12 is a sectional view taken along the section line D-D in FIG. 10;

FIG. 13 is a top view of the pump wheel shown in FIG. 5, showing parameters of the diameter of the pump wheel;

FIG. 14 is a top view of a sealing plate shown in FIG. 5, showing parameters of the diameter of the sealing plate and parameters of the eccentric distance;

DETAILED DESCRIPTION

The following descriptions to preferable embodiments are demonstrative, but are not limitations to the present invention and application or use thereof.

Firstly, construction and operation process of a rotor pump according to an embodiment of the present application are described with reference to FIGS. 5 to 15D. Throughout the drawings, the same reference numbers refer to the same parts, and the repeated description of the same parts will be omitted for corresponding parts.

Figure 5:
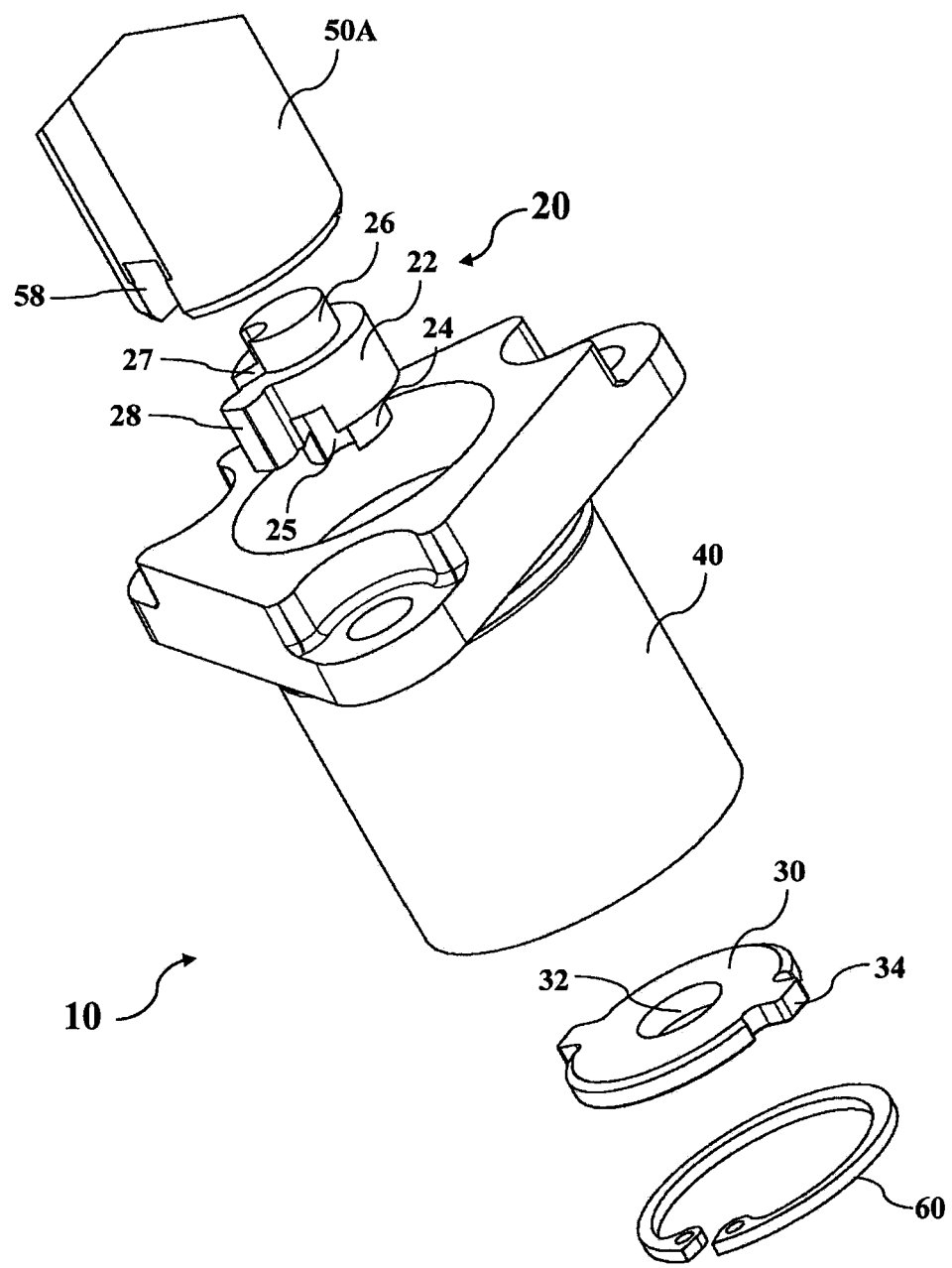
FIG. 5 is a top perspective view of a rotor pump according to an embodiment of the present application.
Figure 6:
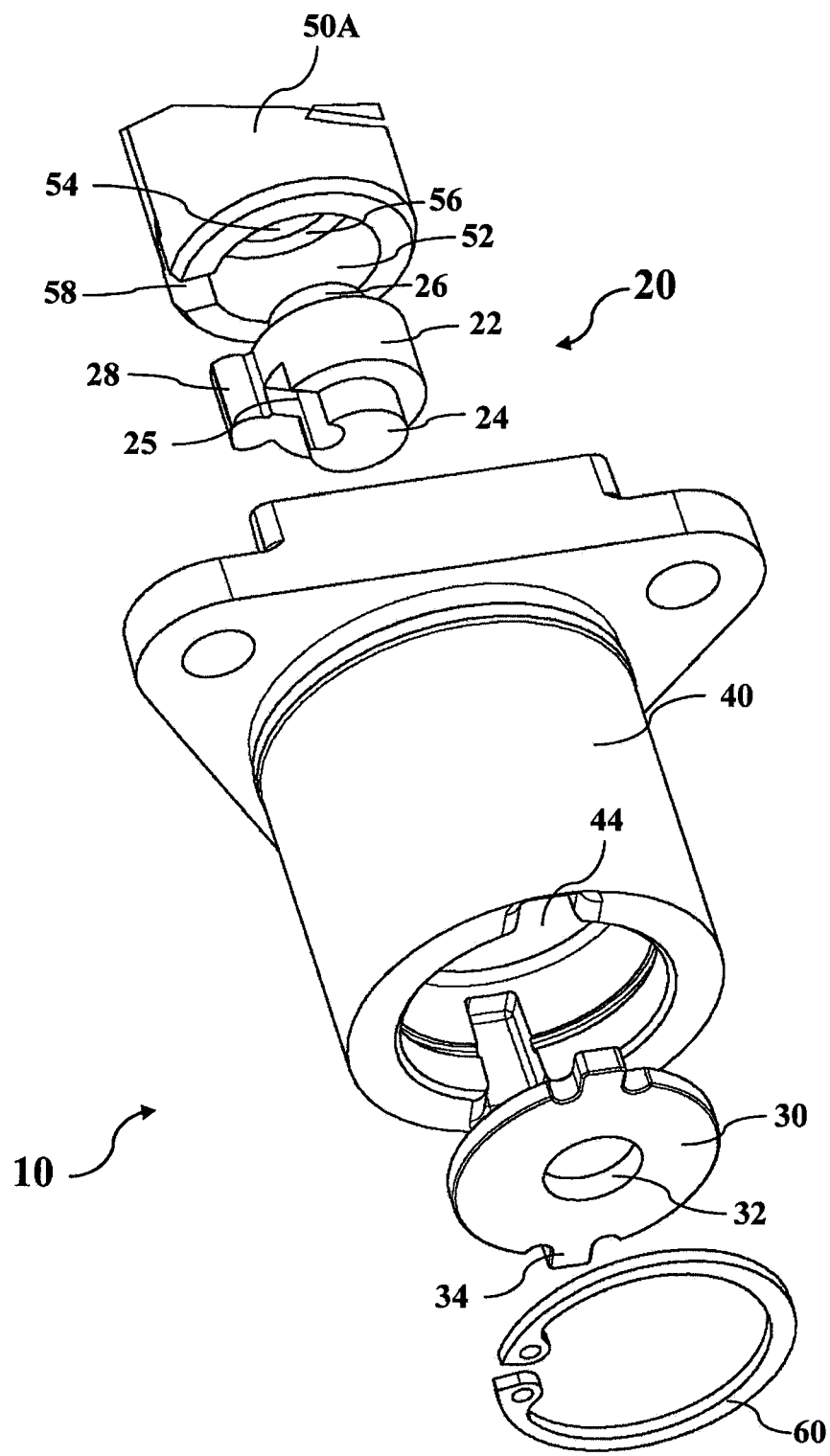
FIG. 6 is a bottom perspective view of the rotor pump according to the embodiment of the present application.
Figure 7A:
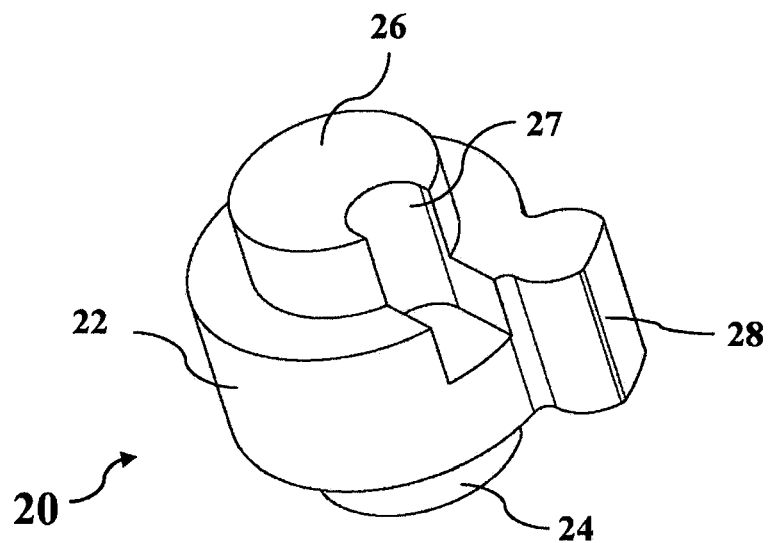
FIG. 7A is a top perspective view of a pump wheel shown in FIG. 5.
Figure 7B:
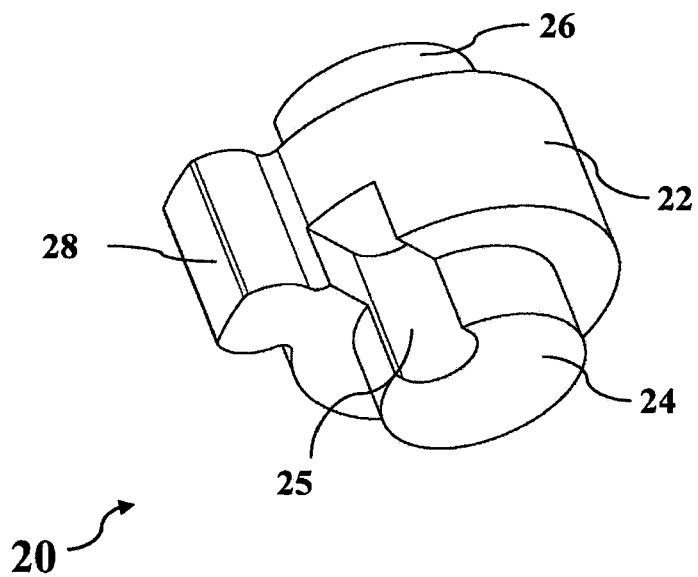
FIG. 7B is a bottom perspective view of the pump wheel.
Figure 9:
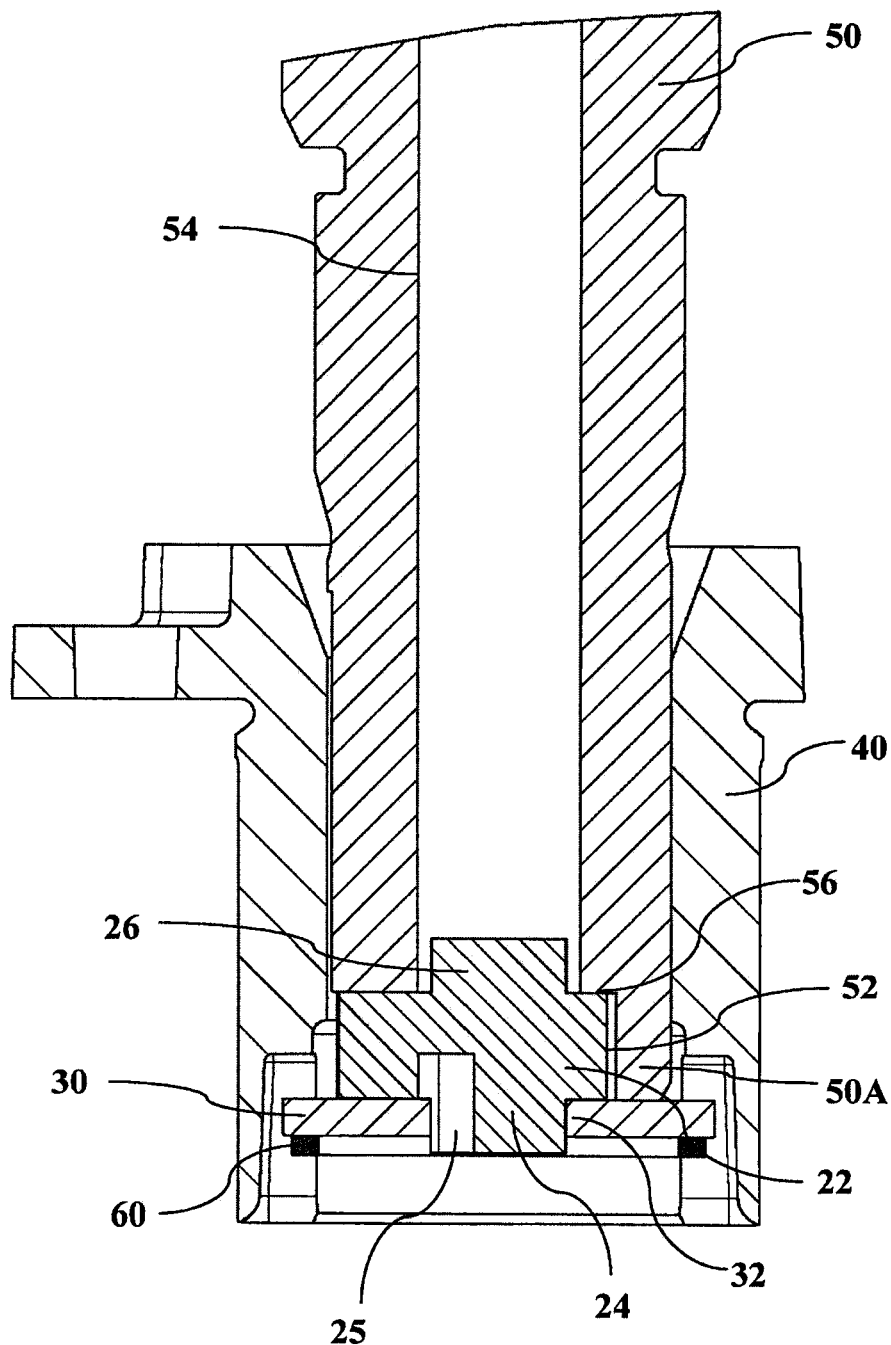
FIG. 9 is a longitudinal sectional view of the rotor pump according to the embodiment of the present application after being assembled taken along a first direction.

FIG. 5 is a top perspective view of a rotor pump 10 according to an embodiment of the present application. FIG. 6 is a bottom perspective view of the rotor pump 10 according to the embodiment of the present application. FIG. 7A is a top perspective view of a pump wheel 20 shown in FIG. 5, and FIG. 7B is a bottom perspective view of the pump wheel 20. FIG. 8A is a top view of the pump wheel 10 shown in FIG. 5, and FIG. 8B is a sectional view taken along a section line A-A in FIG. 8A, and FIG. 8C is a sectional view taken along a section line B-B in FIG. 8A. FIG. 9 is a longitudinal sectional view of the rotor pump 10 according to the embodiment of the present application after being assembled taken along a first direction (passing through a protrusion 28 of the pump wheel 20).

Figure 1:
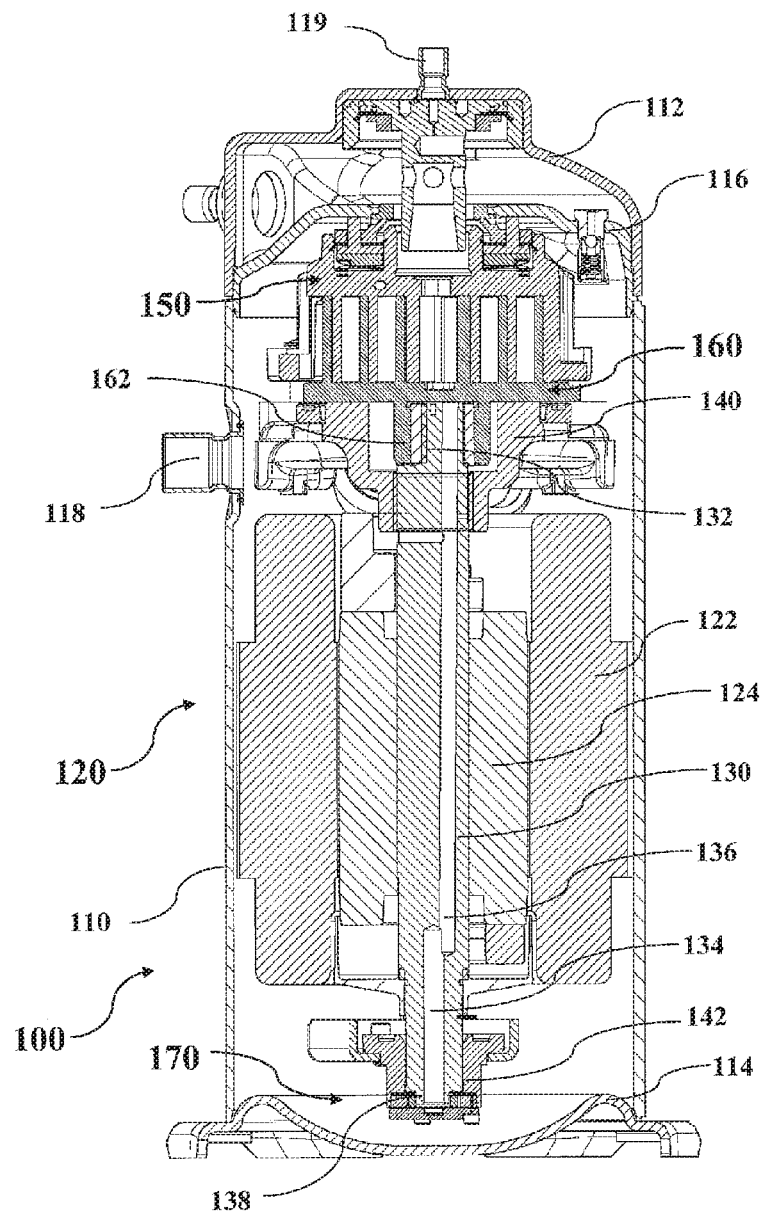
FIG. 1 is a longitudinal sectional view of a conventional scroll compressor.
Figure 2:
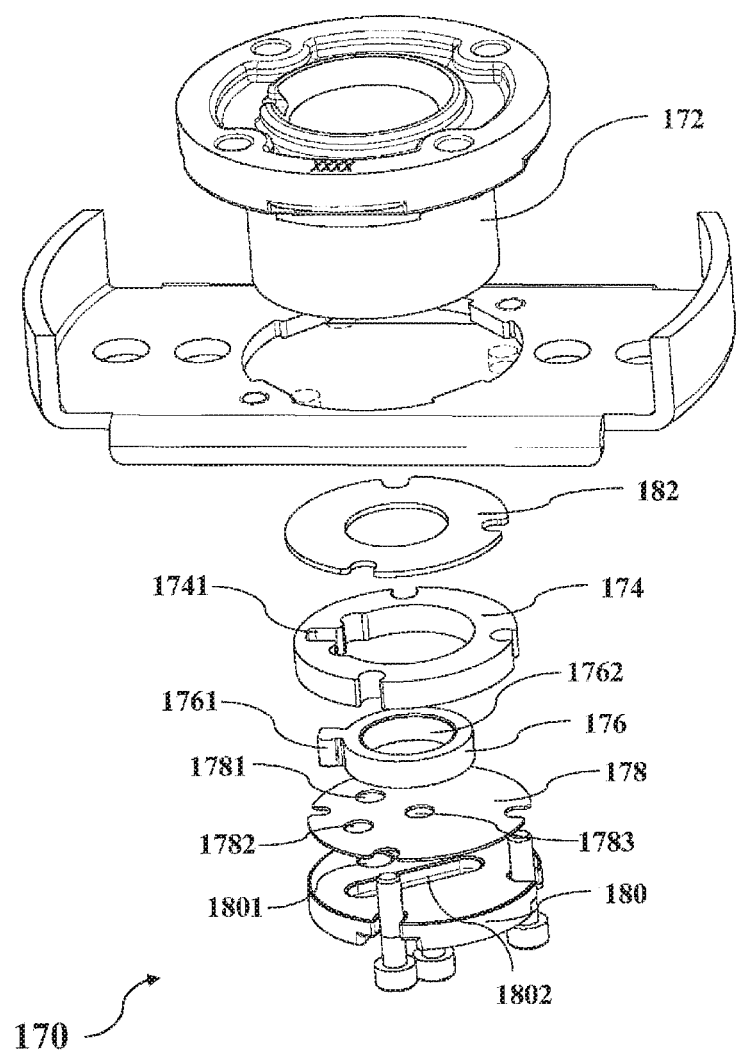
FIG. 2 is an exploded perspective view of a conventional rotor pump.
Figure 3:
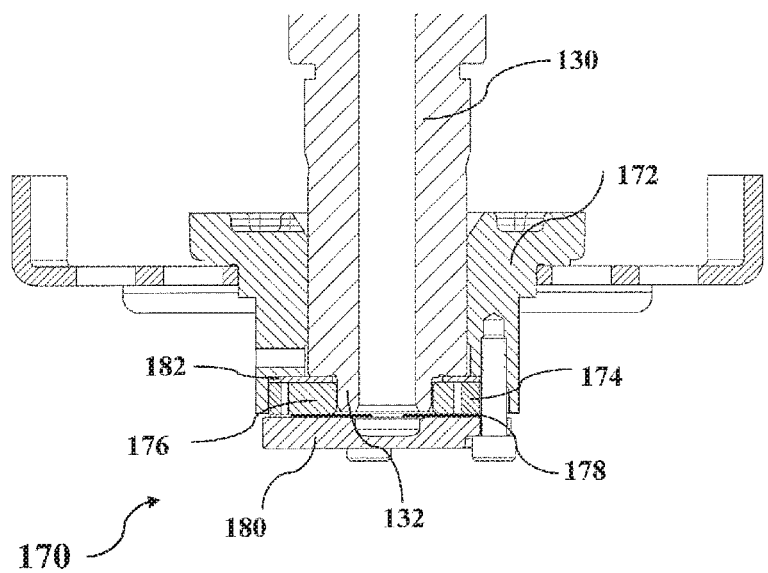
FIG. 3 is a longitudinal sectional view of a conventional rotor pump after being assembled.
Figures 4A, 4B:
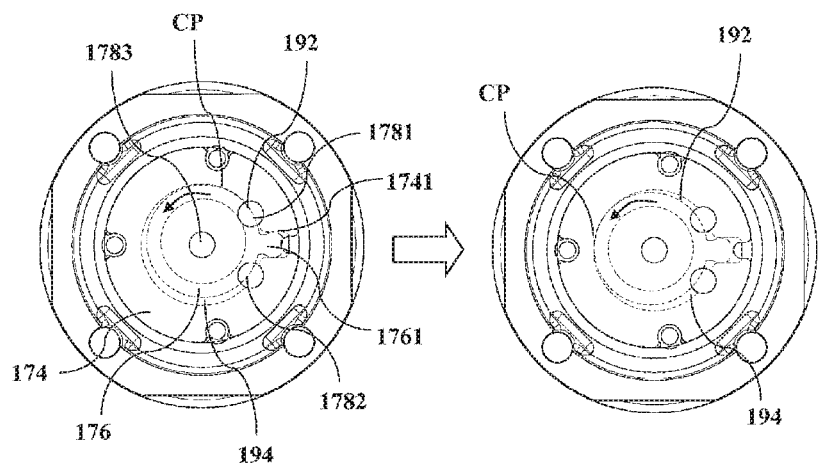
FIGS. 4A, 4B and 4C show an operation process of the conventional rotor pump.
Figure 4C:
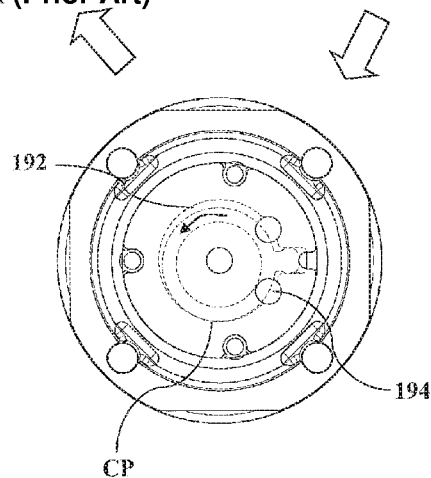

The rotor pump 10 according to the embodiment of the present application can be for example used for the rotary machinery illustrated in FIG. 1, such as a compressor. Referring to FIGS. 5 to 6, the rotor pump 10 can include a pump body 50A which can be rotationally driven.

Figure 10:
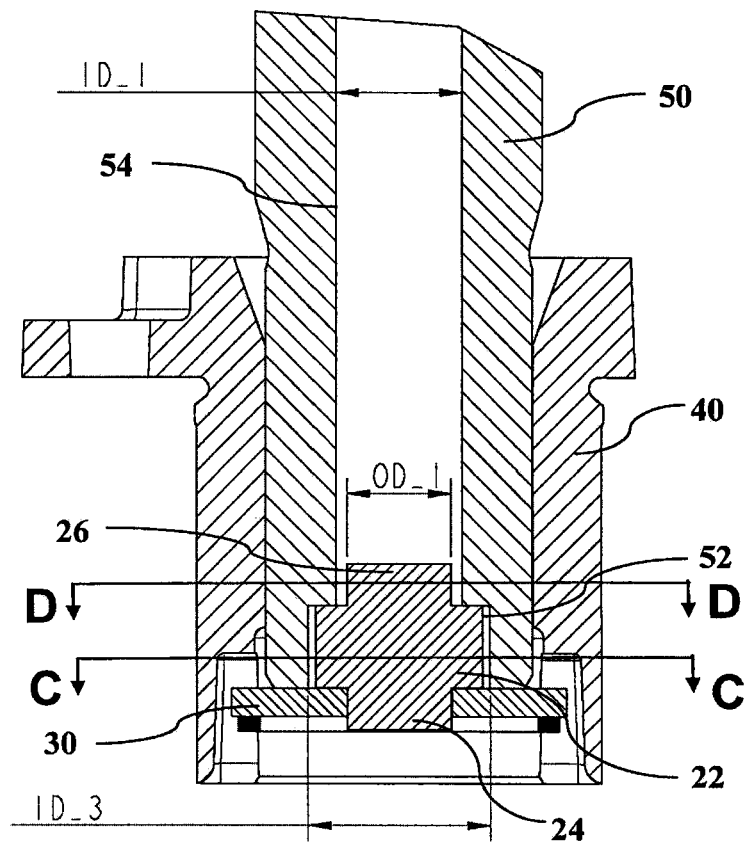
FIG. 10 is a longitudinal sectional view of the rotor pump according to the embodiment of the present application after being assembled taken along a second direction perpendicular to the first direction in FIG. 9.

Also referring to FIGS. 9 to 10, a driving shaft 50 of the rotary machinery, such as a compressor, can form the pump body 50A of the rotor pump 10 by itself. In other words, the pump body 50A can be integrally formed with the driving shaft 50, or the pump body 50A can be formed by a part of the driving shaft 50. Alternatively, the pump body 50A can be arranged separately from the driving shaft 50 and can be rotationally driven by the driving shaft 50. For instance, the pump body 50A can be rotationally driven by the driving shaft 50 via one of belt, chain, and gear.

Specifically, a substantially cylindrical accommodation cavity 52 is formed in the pump body 50A. The accommodation cavity 52 has a bottom wall 56 and is provided with a recess 58 on an inner circumference thereof. A discharge hole 54 can be formed in the bottom wall 56 of the accommodation cavity 52. In an example shown in the figures, the discharge hole 54 can be formed to have a substantially cylindrical shape; however, it can be understood by those skilled in the art that the discharge hole 54 can have any other shape, without affecting implementation of the rotor pump according to the present application. Additionally, in the example shown, the recess 58 is formed to run through a side wall of the pump body 50A in a radial direction, but the recess 58 also can be formed not to run through a side wall of the pump body 50A.

The rotor pump 10 can further include a pump wheel 20 and a sealing plate 30.

The pump wheel 20 includes a substantially cylindrical main body portion 22 which can swing in the accommodation cavity 52, a protrusion 28 which radially extends from the main body portion 22 and can be fitted into the recess 58, a substantially cylindrical first shaft portion 24 which axially extends from the main body portion 22, and a substantially cylindrical second shaft portion 26 which axially extends from the main body portion 22 in a direction opposite to the first shaft portion 24. The diameter of the first shaft portion 24 can be substantially equal to the diameter of the second shaft portion 26. Furthermore, the axial height of the first shaft portion 24 also can be set to be substantially equal to that of the second shaft portion 26. Hence, the pump wheel 20 has a substantially symmetric structure as a whole, which simplifies the production and the subsequent assembling of the pump wheel 20. Here, the diameter OD_2 of the main body portion 22 can be set to be greater than the diameter OD_1 of the first shaft portion 24 or the second shaft portion 26 (referring to FIGS. 10 to 14).

A sealing plate 30 can be positioned relative to the pump body 50A and includes an eccentric hole 32 which is eccentric relative to a rotation axis of the pump body 50A. The eccentric hole 32 can be deviated in any direction relative to the rotation axis of the pump body 50A, with the eccentric distance of the eccentric hole being E. The sealing plate 30 can be positioned relative to the pump body 50A in any way, such that the pump body 50A can rotate and the sealing plate 30 can be in a fixed or static state relative to the pump body 50A. For example, the sealing plate 30 can be fixed on a fixed component of an apparatus employing the rotor pump 10. In the example shown, the sealing plate 30 can be fixed, by a retainer ring 60 or other fixing means, in a bearing housing 40 for supporting the driving shaft 50 or the pump body 50A. In order to prevent the sealing plate 30 from rotating in the bearing housing 40, at least one protrusion 34 can be provided on an outer circumference of the sealing plate 30, and correspondingly, at least one groove 44 can be provided on an inner circumference of the bearing housing 40. Alternatively, at least one groove can be provided on the outer circumference of the sealing plate 30, and at least one protrusion can be provided on the inner circumference of the bearing housing 40.

The first shaft portion 24 of the pump wheel 20 may be rotatably fitted in the eccentric hole 32. Preferably, the diameter OD_1 of the first shaft portion 24 can be set to be substantially equal to the diameter ID_2 of the eccentric hole 32 (referring to FIGS. 10 to 14). The second shaft portion 26 of the pump wheel 20 is housed in the discharge hole 54 of the pump body 50A, and the protrusion 28 of the pump wheel 20 is fitted into the recess 58 of the pump body 50A. Hence, when the driving shaft 50 or the pump body 50A rotates, the pump wheel 20 rotates about the first shaft portion 24 as a rotation axis. Furthermore, since the rotation axis of the first shaft portion 24 is eccentric relative to the rotation axis of the pump body 50A, the main body portion 22 of the pump wheel 20 eccentrically rotates or swings in the accommodation cavity 52 of the pump body 50A, so as to change the volume of a space between the outer circumference of the main body portion 22 and the inner circumference of the accommodation cavity 52, thereby sucking and pumping fluid, which will be described below in detail with reference to FIGS. 15A to 15D.

A suction channel 25 is formed on one side of the pump wheel 20, and a discharge channel 27 is formed on the other side of the pump wheel 20. The suction channel 25 and the discharge channel 27 each are in communication with a compression cavity formed between the outer circumference of the pump wheel 20 and the inner circumference of the accommodation cavity 52. In addition, the compression cavity between the outer circumference of the pump wheel 20 and the inner circumference of the accommodation cavity 52 may be sealed at its top surface and its bottom surface by the bottom wall 56 of the accommodation cavity 52 of the pump body 50A and the sealing plate 30, respectively.

The suction channel 25 can extend to an end face of the first shaft portion 24. The discharge channel 27 can extend to an end face of the second shaft portion 26. More specifically, the suction channel 25 can axially extend from the end face of the first shaft portion 24 into the main body portion 22 and has an opening in a circumferential surface of the main body portion 22 so as to form a fluid channel from the suction side to the compression cavity. The discharge channel 27 can axially extend from the end face of the second shaft portion 26 into the main body portion 22 and has an opening in the circumferential surface of the main body portion 22 so as to form a fluid channel from the compression cavity to the discharge side. In the example shown in FIGS. 7A and 7B, the suction channel 25 opens on the outer circumferential surfaces of the first shaft portion 24 and the main body portion 22, and the discharge channel 27 opens on the outer circumferential surfaces of the second shaft portion 26 and the main body portion 22. However, it is understood by those skilled in the art that constructions of the suction channel 25 and the discharge channel 27 are not limited to this, but can be in any other form. For example, the suction channel 25 can be constructed to axially extend from the center of the end face of the first shaft portion 24 into the main body portion 22 and then radially extend outwards to the outer circumferential surface of the main body portion 22 from the interior of the main body portion 22. In a similar way, the discharge channel 27 can be constructed to axially extend from the center of the end face of the second shaft portion 26 into the main body portion 22 and then radially extend outwards to the outer circumferential surface of the main body portion 22 from the interior of the main body portion 22.

The suction channel 25 and the discharge channel 27 can be provided at two opposite sides of the protrusion 28 and close to the protrusion 28 so as to achieve more efficient suction and discharge of fluid. Further, the suction channel 25 can be arranged on an upstream side of the protrusion 28 in a direction in which the pump wheel 20 is driven, and the suction channel 27 can be arranged on a downstream side of the protrusion 28 in the direction in which the pump wheel 20 is driven.

Furthermore, as shown in FIG. 9, when the rotor pump 10 is in an assembled state, one end face of the main body portion 22 of the pump wheel 20 can abut against the bottom wall 56 of the accommodation cavity 52 of the pump body 50A, and the other end face of the main body portion 22 of the pump wheel 20 can abut against the sealing plate 30. The sealing plate 30 can abut against an end face of the pump body 50A. In other words, the axial height of the main body portion 22 of the pump wheel 20 can be set to be substantially equal to the axial height of the accommodation cavity 52 of the pump body 50A.

With the pump wheel 20 having the above construction, since the first shaft portion 24 and the second shaft portion 26 are in a substantially symmetric state and the suction channel 25 and the discharge channel 27 are also in a substantially symmetric state, either of the first shaft portion 24 and the second shaft portion 26 can be fitted into the eccentric hole 32 of the sealing plate 30 when the rotor pump 10 is assembled, without affecting normal operation of the rotor pump 10.

Figure 11:
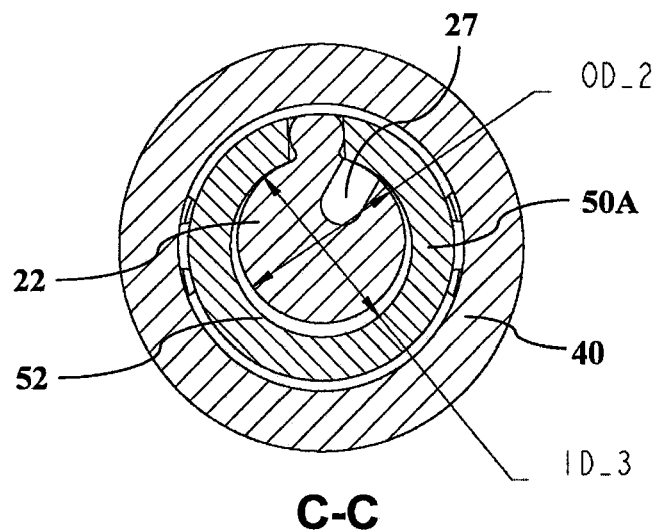
FIG. 11 is a sectional view taken along the section line C-C in FIG. 10.
Figures 15A, 15B:
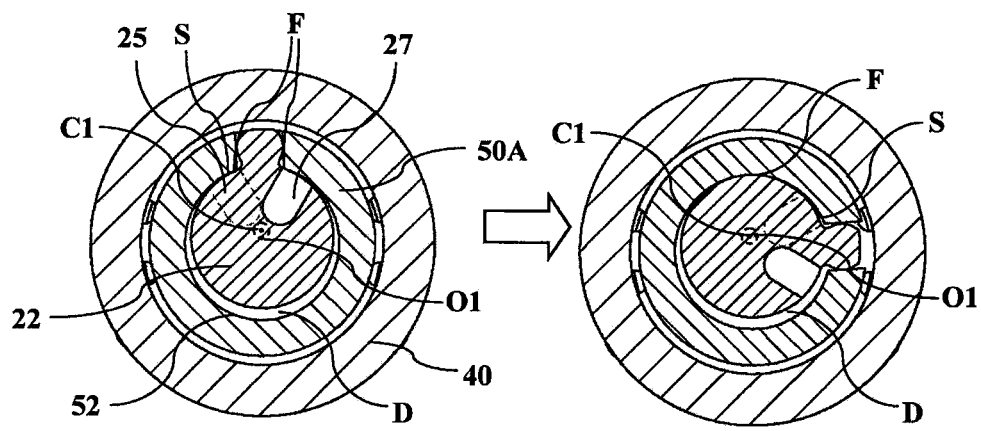
FIGS. 15A, 15B, 15C and 15D show an operation process of the rotor pump according to the embodiment of the present application.
Figures 15C, 15D:
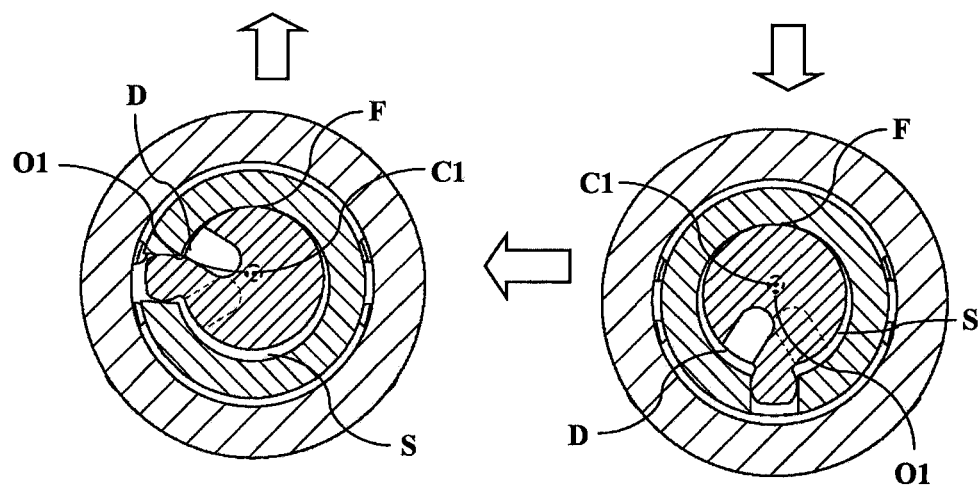

FIG. 10 is a longitudinal sectional view of the assembled rotor pump 10 according to the embodiment of the present application taken along a second direction perpendicular to the first direction in FIG. 9. FIG. 11 is a sectional view taken along the section line C-C in FIG. 10. FIG. 12 is a sectional view taken along the section line D-D in FIG. 10. FIG. 13 is a top view of the pump wheel shown in FIG. 5. FIG. 14 is a top view of a sealing plate shown in FIG. 5.

FIGS. 10 to 14 show parameters of the dimension of various components of the rotor pump 10, for example, the inner diameter $ID\_3$ of the accommodation cavity 52 of the pump body 50A, the inner diameter $ID\_1$ of the discharge hole 54 of the pump body 50A, the inner diameter $ID\_2$ of the eccentric hole 32 of the sealing plate 30, the eccentric distance E of the eccentric hole 32 of the sealing plate 30, the outer diameter $OD\_2$ of the main body portion 22 of the pump wheel 20, the outer diameter $OD\_1$ of the first shaft portion 24 or the second shaft portion 26 of the pump wheel 20. In order to construct the rotor pump 10 to be operated at a higher or highest efficiency, these parameters can be set to satisfy one or more of following equations:

$$OD\_1 = ID\_2 \quad \text{(equation 1)}$$

$$OD\_2 > OD\_1 \quad \text{(equation 2)}$$

$$ID\_1 > OD\_1 \quad \text{(equation 3)}$$

$$ID\_3 > OD\_2 \quad \text{(equation 4)}$$

$$OD\_2 \geq ID\_1 + 2*E \quad \text{(equation 5)}$$

$$ID\_3 = OD\_2 + 2*E \quad \text{(equation 6)}$$

Operation process of the rotor pump 10 according to the embodiment of the present application will be described with reference to FIGS. 15A, 15B, 15C and 15D below.

In FIGS. 15A to 15D, C1 indicates a central axis of the eccentric hole 32; O1 indicates a central axis of the pump wheel 20; F indicates a contact point between the main body portion 22 of the pump wheel 20 and an inner wall of the accommodation cavity 52 of the pump body 50A; S indicates a suction cavity in communication with the suction channel 25; D indicates a discharge cavity in communication with the discharge channel 27. In the present application, the suction cavity S and the discharge cavity D are referred to as compression cavity collectively.

As shown in FIGS. 15A to 15D, when the pump wheel 20 is driven by the pump body 50A to rotate, the central axis O1 of the pump wheel 20 itself may rotate about the central axis C1 of the eccentric hole 32 to change the volumes of the suction cavity S and the discharge cavity D. When the pump wheel 20 is in the position shown in FIG. 15A, due to the present of the protrusion 28 and the recess 58, the main body portion 22 of the pump wheel 20 and the inner wall of the accommodation cavity 52 of the pump body 50A contact at the points F (in this case, there are two points F). At this moment, it can be considered that the suction cavity S has the minimum volume and the discharge cavity D has the maximum volume. When the pump wheel 20 is at a position shown in FIG. 15B, the main body portion 22 of the pump wheel 20 and the inner wall of the accommodation cavity 52 of the pump body 50A contact at the point F (in this case, there is one point F). Thus, the volume of the suction cavity S increases gradually to suck fluid therein, and the volume of the discharge cavity D decreases gradually to discharge the fluid. Next, when the pump wheel 20 is in the position shown in FIGS. 15C and 15D, the volume of the suction cavity S continues to increase gradually, and the volume of the discharge cavity D continues to decreases gradually. Then, when the pump wheel 20 comes back to the position shown in FIG. 15A from the position shown in FIG. 15D, the suction cavity S instantaneously becomes the discharge cavity D. In this way, the fluid sucked in a cycle can be discharged in a next cycle.

Figure 16:
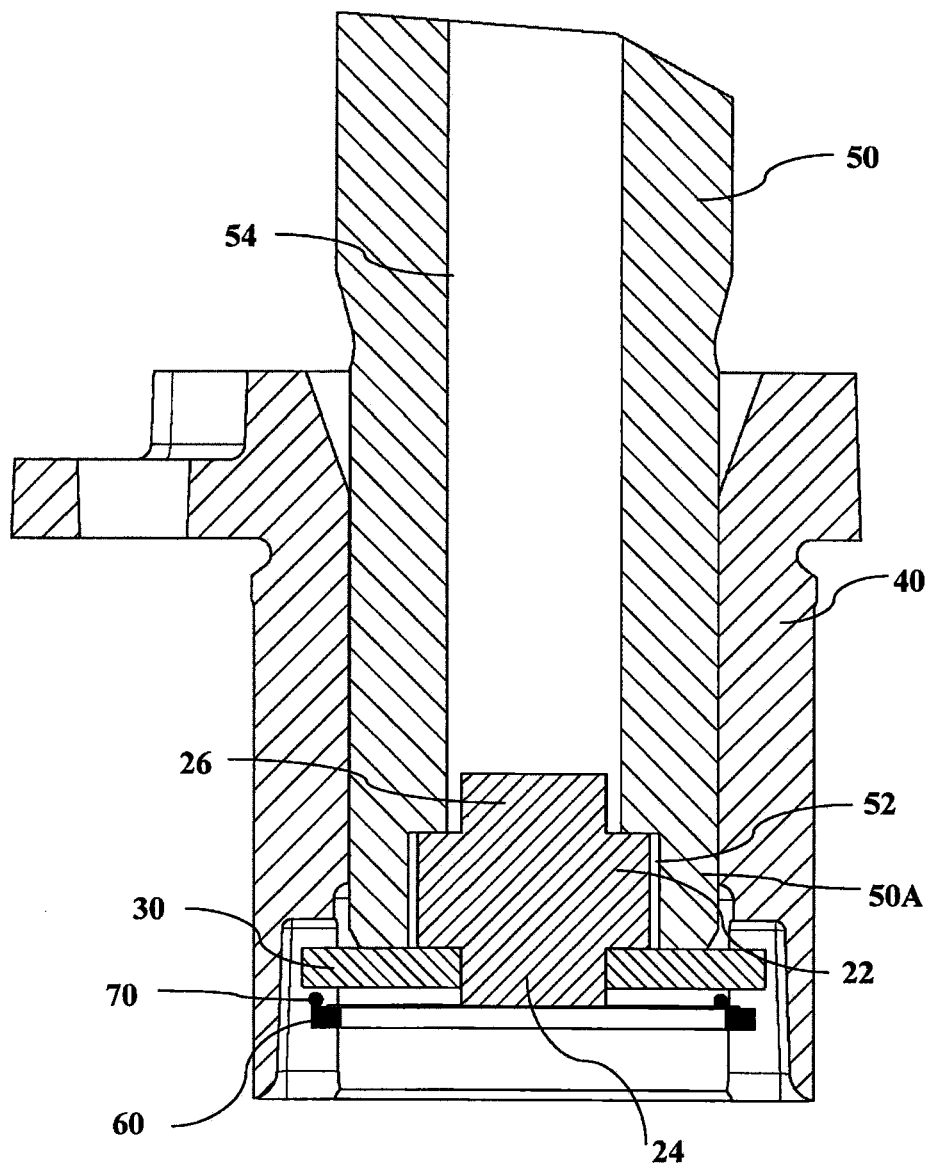
FIG. 16 shows a longitudinal sectional view of a rotor pump according to another embodiment of the present application.

FIG. 16 shows a longitudinal sectional view of a rotor pump according to another embodiment of the present application. In such embodiment, an elastic element, such as a biasing spring 70, is provided between the sealing plate 30 and the retainer ring 60. Other constructions are the same as the above embodiments. Hence, even if the driving shaft 50 or the pump body 50A can be axially moved during the operation of the compressor, it can be ensured that the sealing plate 30 can always abut against the end face of the pump body 50A, improving the stability of the rotor pump.

Figure 17A:
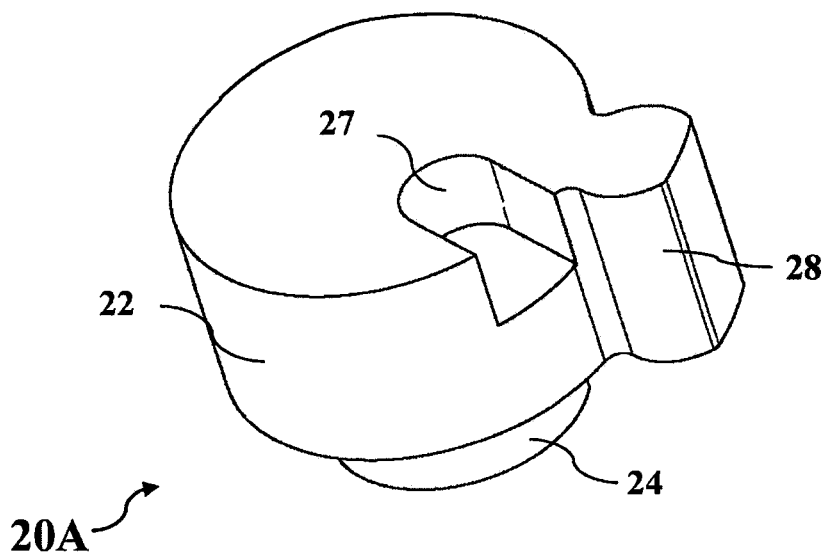
FIGS. 17A and 17B show a top perspective view and a bottom perspective view of a pump wheel according to a further embodiment of the present application, respectively.
Figure 17B:
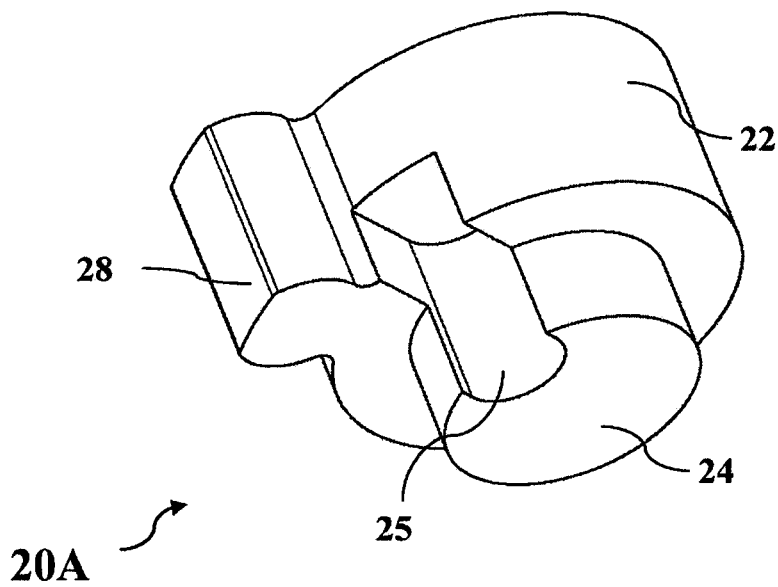

FIGS. 17A and 17B show a top perspective view and a bottom perspective view of a pump wheel 20A according to a further embodiment of the present application, respectively. In the pump wheel 20A shown in FIGS. 17A and 17B, the second shaft portion 26 in the pump wheel 20 in the above embodiments is omitted. With such construction, the normal operation of the rotor pump can be achieved. Additionally, since the pump wheel 20A only includes one shaft portion 24, it is not prone to making a mistake during assembling.

Furthermore, the rotor pump according to above embodiments can be described to be applicable in the scroll compressor shown in FIG. 1, however, it is understood by those skilled in the art that the rotor pump according to the present application also can be applied to a compressor in which lubricating oil is supplied through an oil port in a driving shaft and any other rotary machinery having a driving shaft.

Although various embodiments according to the present application have been described here, it is understood that the present application is not limited to the specific embodiments described in detail and illustrated herein. Other variations and modifications can be achieved by those skilled in the art without departing from the essence and the scope of the present application. All of the variations and the modifications fall into the scope of the present application. Moreover, all of the members described herein can be displaced by other technical equivalents.

The invention claimed is:

1. A rotor pump, comprising:
   a pump body that is rotatably driven, wherein a substantially cylindrical accommodation cavity is formed in the pump body, the accommodation cavity has a bottom wall, and a recess is provided on an inner circumference of the accommodation cavity;
   a pump wheel comprising a substantially cylindrical main body portion swinging in the accommodation cavity, a protrusion which radially extends from the main body portion and is fitted in the recess, and a substantially cylindrical first shaft portion which axially extends from the main body portion; and
   a sealing plate positioned relative to the pump body and comprising an eccentric hole which is eccentric relative to a rotation axis of the pump body,
   wherein the first shaft portion of the pump wheel is rotatably fitted in the eccentric hole, and
   a suction channel is formed on one side of the pump wheel, a discharge channel is formed on the other side of the pump wheel, the suction channel and the discharge channel are each in fluid communication with a compression cavity formed between an outer circumference of the pump wheel and the inner circumference of the accommodation cavity.

2. The rotor pump according to claim 1, wherein the suction channel extends to an end face of the first shaft portion.

3. The rotor pump according to claim 1, wherein a diameter OD_1 of the first shaft portion is substantially equal to a diameter ID_2 of the eccentric hole.

4. The rotor pump according to claim 1, wherein one end face of the main body portion of the pump wheel abuts against the bottom wall of the accommodation cavity of the pump body, and the other end face of the main body portion of the pump wheel abuts against the sealing plate.

5. The rotor pump according to claim 4, wherein the sealing plate abuts against an end face of the pump body.

6. The rotor pump according to claim 1, wherein an axial height of the main body portion of the pump wheel is substantially equal to an axial height of the accommodation cavity of the pump body.

7. The rotor pump according to claim 1, wherein a diameter ID_3 of the accommodation cavity of the pump body is greater than a diameter OD_2 of the main body portion of the pump wheel.

8. The rotor pump according to claim 7, wherein the diameter ID_3 of the accommodation cavity of the pump body, the diameter OD_2 of the main body portion of the pump wheel and an eccentric distance E of the eccentric hole satisfy the following equation:

$$ID\_3=OD\_2+2*E.$$

9. The rotor pump according to claim 1, further comprising a bearing housing for supporting the pump body, wherein the sealing plate is fixed in the bearing housing.

10. The rotor pump according to claim 9, wherein at least one protrusion is formed on one of the bearing housing and the sealing plate, and at least one groove corresponding to the protrusion is formed on the other one of the bearing housing and the sealing plate.

11. The rotor pump according to claim 9, wherein the sealing plate is fixed in the bearing housing by a retainer ring.

12. The rotor pump according to claim 11, wherein a biasing spring is arranged between the sealing plate and the retainer ring.

13. The rotor pump according to claim 1, wherein a diameter OD_2 of the main body portion is greater than a diameter OD_1 of the first shaft portion.

14. The rotor pump according to claim 1, wherein a discharge hole is formed in the bottom wall of the accommodation cavity.

15. The rotor pump according to claim 14, wherein the discharge hole is of a substantially cylindrical shape, a diameter OD_2 of the main body portion of the pump wheel, a diameter ID_1 of the discharge hole of the pump body and an eccentric distance E of the eccentric hole satisfy the following equation:

$$OD\_2 \geq ID\_1 + 2*E.$$

16. The rotor pump according to claim 14, wherein the pump wheel further comprises a substantially cylindrical second shaft portion which axially extends from the main body portion in a direction opposite to the first shaft portion.

17. The rotor pump according to claim 16, wherein the discharge channel extends to an end face of the second shaft portion.

18. The rotor pump according to claim 16, wherein a diameter of the second shaft portion is substantially equal to a diameter of the first shaft portion.

19. The rotor pump according to claim 18, wherein an axial height of the second shaft portion is substantially equal to an axial height of the first shaft portion.

20. The rotor pump according to claim 18, wherein the second shaft portion is fitted into the discharged hole, and the diameter OD_1 of the second shaft portion is smaller than a diameter ID_1 of the discharge hole of the pump body.

21. The rotor pump according to claim 16, wherein the suction passage and the discharge channel are arranged on two opposite sides of the protrusion and close to the protrusion.

22. The rotor pump according to claim 16, wherein the suction channel axially extends from an end face of the first shaft portion into the main body portion and has an opening on a circumferential surface of the main body portion, the discharge channel axially extends from the end face of the second shaft into the main body portion and has an opening on the circumferential surface of the main body portion.

23. The rotor pump according to claim 1, wherein the suction channel is provided on an upstream side of the protrusion in a direction in which the pump wheel is driven, and the discharge channel is provided on a downstream side of the protrusion in the direction in which the pump wheel is driven.

24. A rotary machinery, comprising the rotor pump according to claim 1.

25. The rotary machinery according to claim 24, further comprising a driving shaft, wherein the pump body is integrally formed with the driving shaft.

26. The rotary machinery according to claim 24, further comprising a driving shaft, wherein the pump body is formed by a part of the driving shaft.

27. The rotary machinery according to claim 24, wherein the rotary machinery is a compressor.

28. The rotary machinery according to claim 27, wherein the compressor is a scroll compressor.

* * * * *